J. F. STEDMAN.
STALK PULLING MACHINE.
APPLICATION FILED SEPT. 18, 1920.
1,410,420.
Patented Mar. 21, 1922.
2 SHEETS—SHEET 1.
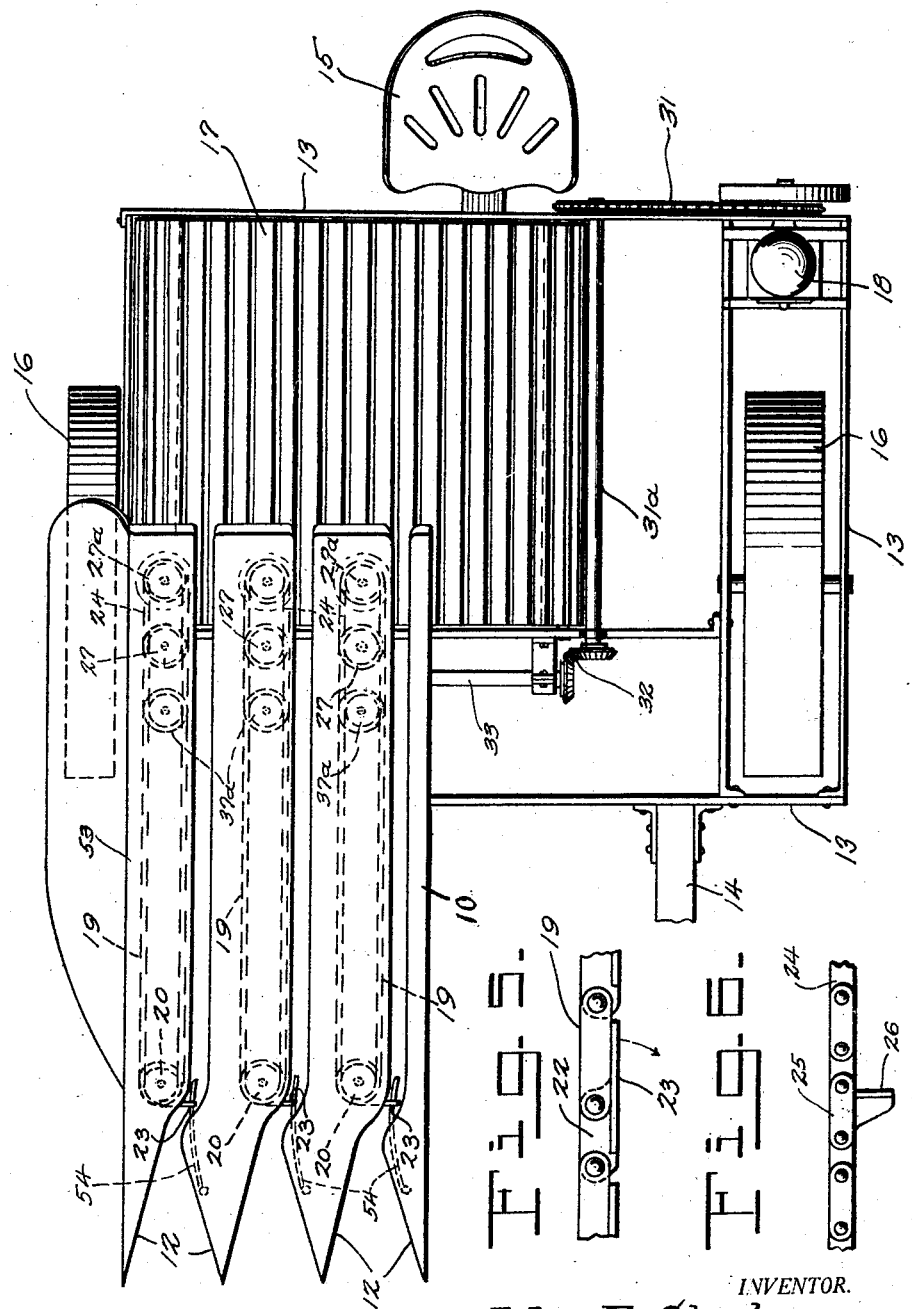
INVENTOR.
John F. Stedman
BY
Max A. Schmidt
ATTORNEY.

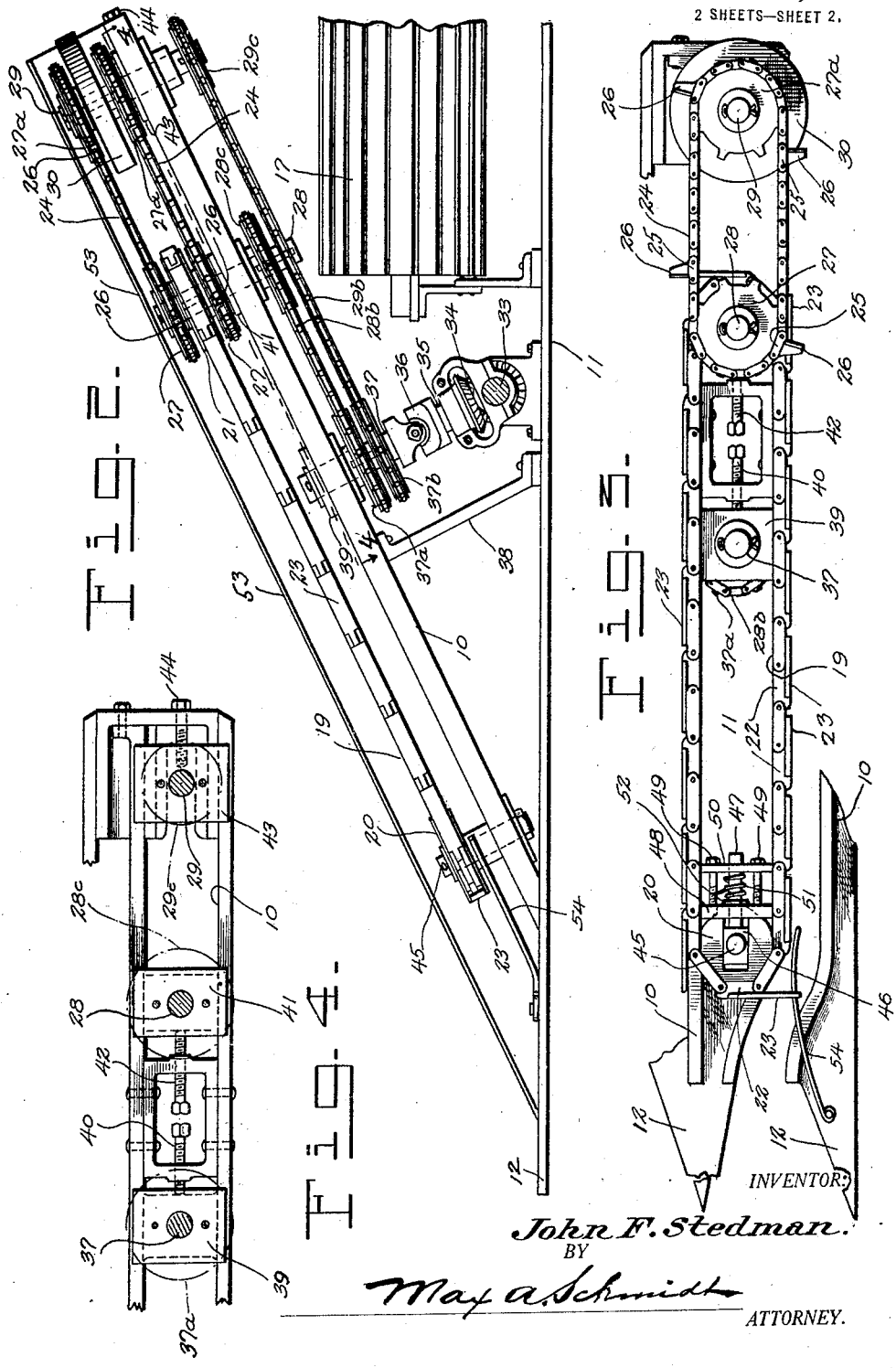

UNITED STATES PATENT OFFICE.

JOHN F. STEDMAN, OF TIGARD, OREGON, ASSIGNOR OF ONE-HALF TO DAVID F. SHOPE, OF PORTLAND, OREGON.

STALK-PULLING MACHINE.

1,410,420.   Specification of Letters Patent.   Patented Mar. 21, 1922.

Application filed September 18, 1920. Serial No. 411,088.

*To all whom it may concern:*

Be it known that I, JOHN F. STEDMAN, a citizen of the United States, residing at Tigard, in the county of Washington and State of Oregon, have invented certain new and useful Improvements in Stalk-Pulling Machines, of which the following is a specification.

This invention relates to machines or apparatus for harvesting flax and similar stalky growths which are taken from the field by being pulled out of the ground.

The invention has for its object to provide in a machine of the kind stated a novel and improved stalk pulling mechanism, and with this object in view, the invention consists in a combination and arrangement of parts to be hereinafter described and claimed.

In order that the invention may be better understood, reference is had to the accompanying drawings forming a part of this specification, and in said drawings—

Figure 1 is a plan view of the machine; Figure 2 is an elevation of a stalk-pulling unit; Figure 3 is a plan view of said unit, with parts broken away; Figure 4 is a sectional detail on the line 4—4 of Figure 2 showing a chain-tightening means; Figure 5 is a plan view showing a fragment of a stalk-pulling chain, and Figure 6 is a similar view showing a fragment of a stalk ejecting chain.

Referring specifically to the drawings, 10 denotes two rearwardly ascending guard members which are spaced to form a stalk passage running parallel to the line of travel of the machine. These guard members are carried by frames 11 which are similarly spaced and have their forward ends 12 pointed to produce a flared throat or entrance for the stalk passage. The machine is provided with a plurality of the hereinbefore described units located side by side to make a wide swath.

A wheeled supporting frame 13 is provided for the guard members 10 and the other parts of the machine to be hereinafter described. The machine may be horse or tractor drawn, and it can also be made self-propelling. A draft tongue or pole is shown at 14, and a seat for the driver at 15. Two supporting wheels are shown at 16, the same being located on opposite sides of the frame 13. The guard members 10 and the mechanism associated therewith are located on one side of the machine, and to the rear of said members and associate mechanism is a conveyor belt 17 for receiving the pulled stalks and conveying the same to a binder mechanism (not shown).

The stalk-pulling mechanism associated with the guard members 10 is shown driven by a gas engine or other motor 18 carried by the frame 13, but it can also be driven by one of the wheels 16, this being immaterial.

With each pair of guard members 10 is associated a mechanism for pulling out of the ground the stalks passing along between said members when the machine is traveling across the field. This mechanism consists of an endless chain 19 carried by one of the guard members and so positioned thereon that it runs along the stalk passage between said member and the adjacent one. The chain is driven in such a direction that its side which is next to the stalk passage has a rearward travel. The chain is equipped with stalk gripping fingers which grasp the stalks, and as the chain travels rearwardly and ascends in this direction, the stalks grasped by the fingers are pulled upwardly out of the ground.

The stalk pulling chain 19 aforementioned passes over front and rear sprocket wheels 20 and 21, and it is made up of ordinary links alternating with special links 22 having projecting fingers 23 extending in the direction of the length thereof from one end and in the same direction the chain runs. The fingers 23 lie close to the outer edges of the chain 19 except when they pass over the sprocket wheels 20 and 21, at which time they extend laterally and outwardly from the chain. As the sprocket wheel 20 is located near the entrance end of the stalk passage, the laterally projecting fingers, one after the other, come behind a bunch of stalks, and as the chain continues to travel rearwardly, the fingers swing over toward the outer edge of the chain, so that the stalks are now firmly grasped between said edge and the fingers. As the chain also ascends in its rearward travel, it will be evident that the stalks are pulled upwardly out of the ground and carried rearwardly in upright position. When the fingers reach the upper and rear end of the stalk passage, and the links 22 start to go around the sprocket wheel 21, the fingers 23 again swing to extend laterally from the chain, and thus release the pulled stalks. A means to be presently described is located at this end of the chain for ejecting the pulled stalks and assuring their delivery to the conveyer belt 17, the rear end of the stalk-pulling mechanism overhanging said belt so that the stalks drop down thereon when they are released.

The stalk releasing device hereinbefore referred to comprises two endless chains 24 similar to the chain 19 but much shorter than the latter chain. The chains 24 are located respectively above and below the chain 19 and they run parallel thereto. The special links 25 of the chains 24 have laterally projecting fingers or spurs 26 which run close to the upper and lower sides of the chain 19. The fingers 26 are positioned at such intervals and timed to meet each finger 23 of chain 19 back of its load just as said finger 23 begins to open. The chains 24 travel faster than chain 19 so as to eject the stalks beyond the fingers 23 before the latter begin to swing inwardly again toward the side of the chain 19.

Each chain 24 is trained over sprocket wheels 27 and 27$^a$. The sprocket wheels 27 are located above and below the sprocket wheel 21, these three sprocket wheels being mounted on a shaft 28. Sprocket wheel 21 is fast on shaft 28, whereas the sprocket wheels 27 are loose on said shaft. The sprocket wheels 27$^a$ are positioned rearwardly of the sprocket wheels 27 and they are fast on a shaft 29. It will therefore be seen that the ejector chains 24 run to the rear of the chain 19.

When the chain links 25 carrying the fingers 26 come above and below the sprocket wheel 21, and the fingers 23 are releasing the stalks, the latter are forced rearwardly by the fingers 26 and thrown on the conveyer belt 17. It will be understood that the stalks gripped by the fingers 23 project above and below the same a considerable distance so as to be in the path of the ejector fingers 26.

Between the sprocket wheels 27$^a$ the shaft 29 carries a wheel or disk 30 somewhat larger in diameter than that of said sprocket wheels so that its periphery extends out as far as the ejector fingers 26. This wheel is located in line with the chain 19. The ejector chains 24 run faster than the chain 19, and the former have a tendency to carry some of the stalks around, this however being prevented by the wheel 30 which crowds outwardly all the stalks that might hang to the fingers 26, and thus assures the release of the stalks and their delivery to the conveyer belt 17.

The motor 18 is shown as having a driving connection 31 with a shaft 31$^a$ connected by a bevel gearing 32 to a shaft 33 connected by a bevel gearing 34 to an upright shaft 35 connected by a universal joint 36 to a shaft 37 fitted with sprocket wheels 37$^a$ and 37$^b$, respectively. Sprocket wheel 37$^a$ is connected by a chain 28$^b$ to a sprocket wheel 28$^c$ on shaft 28, whereby the chain 19 is driven. Sprocket wheel 37$^b$ is connected by a chain 29$^b$ to a sprocket wheel 29$^c$ on shaft 29, whereby the chains 24 and the wheel 30 are driven. The shaft 33 extends beneath the entire set of stalk-pulling chains and has a driving connection with each pulling and ejector chain. The frame members 11 carry upright supports 38 for the guard members 10.

The shaft 37 has a bearing in a slide 39 carried by the guard members 10 and adjustable by a screw 40, and the shaft 28 has a bearing in a similar slide 41 adjustable by a screw 42. The shaft 29 also has a bearing in a slide 43 adjustable by a screw 44. The purpose of these adjustable bearings is to take up slack in the several chains resulting from wear or other causes.

The shaft 45 of sprocket wheel 20 is carried in a slidably supported bearing 46 engageable by a spring pressed pusher pin 47 passing through a cross bar 48 carrying adjusting screws 49 supporting a cross bar 50, through which the pin 47 extends. The spring 51 for holding the pin 47 advanced against the bearing 46 is coiled around the pin between the cross bar 50 and an abutment 52 on the pin. The tension of the spring 51 is adjustable by the screws 49 through the cross bar 50. The spring 51 governs the pressure of the fingers 23 of chain 19, and the yielding support obtained for the sprocket wheel 20 takes care of the shortening of the chain 19 when loaded with stalks.

A cover plate for the chains 19 and 24 is shown at 53.

At the entrance end of the stalk passage are spring wire fingers 54 which project back over to the point where the fingers 23 pick up the stalks, and act as stops to hold the stalks up so that the fingers 23 may grasp all of them.

The preferred embodiment of the invention has been disclosed, but it will be understood that various changes and modifications may be made without a departure from the spirit and scope of the invention as claimed hereinafter. It will also be understood that although the machine is intended primarily for harvesting flax, it can be used for pulling other stalky plants out of the ground, and the stalk-pulling and ejecting chains are also capable of use for various other purposes.

I claim:

1. In a stalk-pulling machine, a traveling supporting frame, rearwardly ascending guard members which are laterally spaced to form a stalk passage, and an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage.

2. In a stalking-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, and means at the exit end of the stalk passage for throwing the stalks clear of the chain as the fingers swing to release the stalks.

3. In a stalk-pulling machine, a traveling supporting frame, rearwardly ascending guard members which are laterally spaced to form a stalk passage, and an endless chain positioned to travel rearwardly along the stalk passage from the entrance to the exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during its travel between said ends of the stalk passage.

4. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during its travel between said ends of the stalk passage, and means at the exit end of the stalk passage for throwing the stalks clear of the chain as the fingers swing to release the stalks.

5. In a stalk-pulling machine, a traveling supporting frame, rearwardly ascending guard members which are laterally spaced to form a stalk passage, an endless chain positioned to travel rearwardly along the stalk passage from the entrance to exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during its travel between said ends of the stalk passage, and sprocket wheels over which the chain is trained, said sprocket wheels being located at the aforesaid ends of the stalk passage.

6. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, and a second endless chain at the exit end of the stalk passage having means for throwing the stalks clear of the first-mentioned chain as the fingers swing to release the stalks.

7. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, and a second endless chain at the exit end of the stalk passage, said chain having links provided with laterally projecting stalk-engaging fingers for throwing the stalks clear of the first-mentioned chain as the fingers thereof swing to release the stalks.

8. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during its travel between said ends of the stalk passage, and a second endless chain at the exit end of the stalk passage, said chain having links provided with laterally projecting stalk-engaging fingers for throwing the stalks clear of the first-mentioned chain as the fingers thereof swing to release the stalks.

9. In a stalk-pulling machine, a traveling supporting frame, rearwardly ascending guard members which are laterally spaced to form a stalk passage, an endless chain positioned to travel rearwardly along the stalk passage from the entrance to exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during its travel between said ends of the stalk passage, and sprocket wheels over which the chain is trained, said sprocket wheels being located at the aforesaid ends of the stalk passage, the sprocket wheel at the entrance end of the stalk passage being yieldingly supported.

10. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, and sprocket wheels over which the chain is trained, said sprocket wheels being located at the aforesaid ends of the stalk passage, the sprocket wheel at the entrance end of the stalk passage being yieldingly supported.

11. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, a second endless chain at the exit end of the stalk passage having means for throwing the stalks clear of the first-mentioned chain as the fingers swing to release the stalks, sprocket wheels at the entrance and exit ends of the stalk passage over which the first-mentioned chain is trained, shafts carrying said sprocket wheels, a drive shaft having a driving connection with the shaft of the sprocket wheel at the exit end of the stalk passage, sprocket wheels over which the second-mentioned chain is trained, one of said last mentioned sprocket wheels being loose on the shaft of the sprocket wheel at the exit end of the stalk passage, a shaft supporting the other one of the sprocket wheels of the second-mentioned chain, and a driving connection between the last mentioned shaft and the drive shaft.

12. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, and a pair of endless chains at the exit end of the stalk passage having means for throwing the stalks clear of the first-mentioned chain as the fingers thereof swing to release the stalks, said second-mentioned chains being located above and below the first-mentioned chain.

13. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, a pair of endless chains at the exit end of the stalk passage having means for throwing the stalks clear of the first-mentioned chain as the fingers thereof swing to release the stalks, said second-mentioned chains being located above and below the first-mentioned chain, and extending rearwardly beyond the rear end thereof, and a stalk ejector member rotatable between the second-mentioned chains at the rear ends thereof for forcing the stalks therefrom.

14. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, and a pair of endless chains at the exit end of the stalk passage having links provided with laterally projecting fingers for throwing the stalks clear of the first-mentioned chain as the fingers thereof swing to release the stalks, said second-mentioned chains being located above and below the first-mentioned chain.

15. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, a pair of endless chains at the exit end of the stalk passage for throwing the stalks clear of the first-mentioned chain as the fingers thereof swing to release the stalks, said second-mentioned chains being located above and below the first-mentioned chain, and extending rearwardly beyond the rear end thereof, and a stalk ejector member rotatable between the second-mentioned chains at the rear ends thereof for forcing the stalks therefrom.

16. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during its travel between said ends of the stalk passage, and a pair of endless chains at the exit end of the stalk passage having links provided with laterally projecting fingers for throwing the stalks clear of the first-mentioned chain as the fingers thereof swing to release the stalks, said second-mentioned chains being located above and below the first-mentioned chain.

17. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during the travel between said ends of the stalk passage, a pair of endless chains at the exit end of the stalk passage having links provided with laterally projecting fingers for throwing the stalks clear of the first-mentioned chain as the fingers thereof swing to release the stalks, said second-mentioned chains being located above and below the first-mentioned chain, and extending rearwardly beyond the rear end thereof, and a stalk ejector member rotatable between the second-mentioned chains at the rear ends thereof for forcing the stalks therefrom.

18. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, a second endless chain at the exit end of the stalk passage having means for throwing the stalks clear of the first-mentioned chain as the fingers swing to release the stalks, and means associated with the second-mentioned chain for forcing the stalks therefrom.

19. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, a second endless chain at the exit end of the stalk passage, said chain having links provided with laterally projecting stalk-engaging fingers for throwing the stalks clear of the first-mentioned chain as the fingers thereof swing to release the stalks, and means associated with the second-mentioned chain for forcing the stalks from the fingers thereof.

20. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having links provided with lengthwise projecting stalk-gripping fingers extending in the direction the chain travels, said fingers swinging away from the side of the chain at the entrance and exit ends of the stalk passage, and closing in against the side of the chain during its travel between said ends of the stalk passage, a second endless chain at the exit end of the stalk passage, said chain having links provided with laterally projecting stalk-engaging fingers for throwing the stalks clear of the first-mentioned chain as the fingers thereof swing to release the stalks, and means associated with the second-mentioned chain for forcing the stalks from the fingers thereof.

21. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, a pair of endless chains at the exit end of the stalk passage having links provided with laterally projecting fingers for throwing the stalks clear of the first-mentioned chain as the fingers thereof swing to release the stalks, said second-mentioned chains being located above and below the first-mentioned chain, and means associated with the second-mentioned chain for forcing the stalks from the fingers thereof.

22. In a stalk-pulling machine, a traveling supporting frame, rearwardly ascending guard members which are laterally spaced to form a stalk passage, an endless chain positioned to travel rearwardly along the stalk passage from the entrance to the exit ends thereof, said chain having stalk-gripping fingers swinging away from the side of the chain at the entrance and exit ends of the stalk passage, and closing in against the side of the chain during its travel between said ends of the stalk passage, and a stalk pickup finger at the entrance end of the stalk passage.

In testimony whereof I affix my signature.

JOHN F. STEDMAN.